(12) United States Patent
Van Landeghem

(10) Patent No.: US 11,939,131 B2
(45) Date of Patent: Mar. 26, 2024

(54) RECYCLABLE BLISTER PACKAGE

(71) Applicant: Tekni-Plex, Inc., Wayne, PA (US)

(72) Inventor: Robin Van Landeghem, Deinze (BE)

(73) Assignee: Tekni-Plex,. Inc., Wayne, PA (US)

( * ) Notice: Subject to any disclaimer, the term of this patent is extended or adjusted under 35 U.S.C. 154(b) by 188 days.

(21) Appl. No.: 17/830,461

(22) Filed: Jun. 2, 2022

(65) Prior Publication Data

US 2022/0388749 A1  Dec. 8, 2022

Related U.S. Application Data

(60) Provisional application No. 63/196,577, filed on Jun. 3, 2021.

(51) Int. Cl.
*B65D 75/32* (2006.01)
*B65D 65/40* (2006.01)
*B65D 75/36* (2006.01)

(52) U.S. Cl.
CPC ........... *B65D 75/327* (2013.01); *B65D 65/40* (2013.01); *B65D 75/367* (2013.01); *B65D 2565/386* (2013.01)

(58) Field of Classification Search
CPC ..... B32B 27/30; B32B 27/304; B65D 75/367; B65D 65/40; B65D 75/327; B65D 2565/386
USPC ....... 206/528–540, 426; 428/426, 211.1, 511
See application file for complete search history.

(56) References Cited

U.S. PATENT DOCUMENTS

| 6,329,047 | B1 | 12/2001 | Beer et al. |
| 6,592,978 | B1* | 7/2003 | Miller ................. B32B 7/12 |
| | | | 206/532 |
| 6,641,925 | B1 | 11/2003 | Beer et al. |
| 7,758,936 | B2* | 7/2010 | Spallek ................ B32B 27/304 |
| | | | 428/34.1 |
| 2008/0197045 | A1 | 8/2008 | Metzger et al. |
| 2010/0155288 | A1* | 6/2010 | Harper ................ B32B 27/32 |
| | | | 428/479.3 |
| 2010/0170820 | A1* | 7/2010 | Leplatois ............. B32B 27/306 |
| | | | 156/324 |
| 2011/0049003 | A1* | 3/2011 | Bellamah ............. B32B 27/08 |
| | | | 205/183 |
| 2015/0096920 | A1* | 4/2015 | Trombley ............. B65D 75/36 |
| | | | 206/531 |
| 2015/0298439 | A1* | 10/2015 | Osborn ............... B32B 27/327 |
| | | | 428/480 |

(Continued)

FOREIGN PATENT DOCUMENTS

CA  2219156     4/1998
CA  2276540 A1  6/1999

(Continued)

OTHER PUBLICATIONS

Written Opinion in related international application No. PCT/US2022/031880 dated May 9, 2023.

(Continued)

*Primary Examiner* — Chun Hoi Cheung
(74) *Attorney, Agent, or Firm* — Polsinelli, P.C.

(57) ABSTRACT

A blister package is provided that includes a base made from cyclic olefin copolymer (COC) and a lidding film that includes polyolefin layer(s) or a combination of polyolefin and COC layers, that allows both the lidding film and base to be recycled in a single plastic waste stream.

19 Claims, 10 Drawing Sheets

(56) References Cited

U.S. PATENT DOCUMENTS

| | | | | |
|---|---|---|---|---|
| 2016/0122103 A1* | 5/2016 | Havrileck | ............... | B65D 85/72 |
| | | | | 426/115 |
| 2019/0009963 A1* | 1/2019 | Wessely | ............... | B65D 75/327 |
| 2020/0156842 A1 | 5/2020 | Redrup | | |
| 2022/0144515 A1 | 5/2022 | Priscal et al. | | |

FOREIGN PATENT DOCUMENTS

| | | | |
|---|---|---|---|
| CA | 2276723 | A1 | 6/1999 |
| CA | 2276728 | A1 | 6/1999 |
| DE | 102005035705 | A1 | 2/2007 |
| DE | 102019101066 | A1 | 7/2020 |
| EP | 0570188 | A2 | 11/1993 |
| EP | 0631864 | A1 | 5/1994 |
| EP | 0968817 | A3 | 5/2000 |
| EP | 0968819 | A3 | 5/2000 |
| EP | 09688818 | B1 | 5/2000 |
| JP | H07257636 | A | 10/1995 |
| WO | 2009/000403 | A1 | 12/2008 |
| WO | 2010139409 | A1 | 12/2010 |
| WO | 2014/088585 | A1 | 6/2014 |
| WO | 2017114590 | A1 | 7/2017 |
| WO | 2020205061 | A1 | 10/2020 |

OTHER PUBLICATIONS

International Preliminary Report on Patentability in related international application No. PCT/US2022/031880 dated Sep. 9, 2023.
International Search Report and Written Opinion in related international application No. PCT/US2022/031880 dated Sep. 26, 2022.

\* cited by examiner

| Package number | Blister base | Lidding |
|---|---|---|
| 1 | COC P7P EXP2 | White PP Barrier Lidding (SR#2061) |
| 2 | COC P15P EXP1 | White PP Barrier Lidding (SR#2061) |
| 3 | ECO P7P EXP4 | White PP Barrier Lidding (SR#2061) |

FIG. 8A

| Sample | Intensity | Classification | Valve Control |
|---|---|---|---|
| No. 1 | | | |
| No. 2 | | | |
| No. 3 | | | |

FIG. 8B

| Sample No. | Sample | NIR Detection (Scan-Modus) [Material - pixels at 0.5 m/s - (Σ Pixels)]; Intensity [average value] | |
|---|---|---|---|
| 1 | Blister pack consisting of COC P7P blister & white barrier PP lidding | Front<br>PP 3D - 32<br>PP 2D - 2423<br>Unknown - 51<br><br>Intensity: 19.6% | Back<br>PP 3D - 490<br>PP 2D - 1950<br>PA - 3<br>PUR - 14<br>Unknown - 46<br>Intensity: 18.3% |
| 2 | Blister pack consisting of COC P15P blister & white barrier PP lidding | Front<br>PP 3D - 393<br>PP 2D - 2075<br>Unknown - 67<br><br>Intensity: 18.7% | Back<br>PP 3D - 1618<br>PP 2D - 887<br>PUR - 2<br>Unknown - 50<br>Intensity: 19.4% |
| 3 | Blister pack consisting of ECO P7P blister & white barrier PP lidding | Front<br>PP 3D - 2146<br>PP 2D - 432<br>Unknown - 7<br><br>Intensity: 20.5% | Back<br>PP 3D - 2253<br>PP 2D - 229<br>PUR - 7<br>Unknown - 22<br>Intensity: 19.2% |

FIG. 9A

| Sample No. | Discharge behaviour | Result |
|---|---|---|
| 1, 2, 3 | ≥ 80% | sorting test passed ✓ |

FIG. 9B

| Sample No. | Sortability as "PP" | Result | Factor C2/C2' in the CHI evaluation standard |
|---|---|---|---|
| 1 | Unrestricted sortability | 100 % | 1.000 ✓ |
| 2 | Unrestricted sortability | 100 % | 1.000 ✓ |
| 3 | Unrestricted sortability | 100 % | 1.000 ✓ |

FIG. 9C

| Reference | Layer | Layer Thickness | Layer Material |
|---|---|---|---|
| COC P7P EXP2 | Layer 1<br>Layer 2<br>Layer 3<br>Layer 4<br>Layer 5 | 15μ<br>15μ<br>190μ<br>15μ<br>15μ | PP<br>Tie resin<br>COC<br>Tie resin<br>PP |
| COC P15P EXP1 | Layer 1<br>Layer 2<br>Layer 3<br>Layer 4<br>Layer 5 | 24μ<br>15μ<br>380μ<br>15μ<br>24μ | PP<br>Tie resin<br>COC<br>Tie resin<br>PP |
| ECO P7P EXP4 | Layer 1<br>Layer 2<br>Layer 3<br>Layer 4<br>Layer 5<br>Layer 6<br>Layer 7 | 55μ<br>15μ<br>180μ<br>15μ<br>15μ<br>15μ<br>50μ | PP<br>Tie resin<br>COC<br>Tie resin<br>EVOH<br>Tie resin<br>PP |

FIG. 10A

| Reference | Layer | Layer Thickness | Layer Material |
|---|---|---|---|
| SR#2057 | Layer 1<br>Layer 2 | 0.6 mil<br>2 mil | MET BOPP film<br>PP heat seal film (peel) |
| SR#2059 | Layer 1<br>Layer 2 | 0.7 mil<br>2 mil | SiOx BOPP film<br>PP heat seal film (peel) |
| SR#2060 | Layer 1<br>Layer 2 | 0.7 mil<br>2.5 mil | SiOx BOPP film<br>PP heat seal film (weld) |
| SR#2061 | Layer 1<br>Layer 2 | 0.7 mil<br>2.5 mil | SiOx BOPP film<br>PP heat seal film (weld) |
| SR#2062 | Layer 1<br>Layer 2 | 1.2 mil<br>2.5 mil | BOPP film<br>PP heat seal film (weld) |
| SR#2063 | Layer 1<br>Layer 2 | 1.2 mil<br>2 mil | BOPP film<br>PP heat seal film (peel) |
| SR#2064 | Layer 1<br>Layer 2 | 1.2 mil<br>4 mil | BOPP film<br>COC film |
| SR#2065 | Layer 1<br>Layer 2 | 0.7 mil<br>4 mil | SiOx BOPP film<br>COC film |
| SR#2066 | Layer 1<br>Layer 2 | 0.6 mil<br>4 mil | MET BOPP film<br>COC film |

FIG. 10B

| Category | Blister base example |
|---|---|
| Low barrier | PVC, PET |
| High barrier | PVC/PVDC (traditional barrier), PP-COC-PP, PP-COC-EVOH-PP, COC |
| Ultra high barrier | PVC/PCTFE, PVC/PVDC (ultra high barrier) |

FIG. 11A

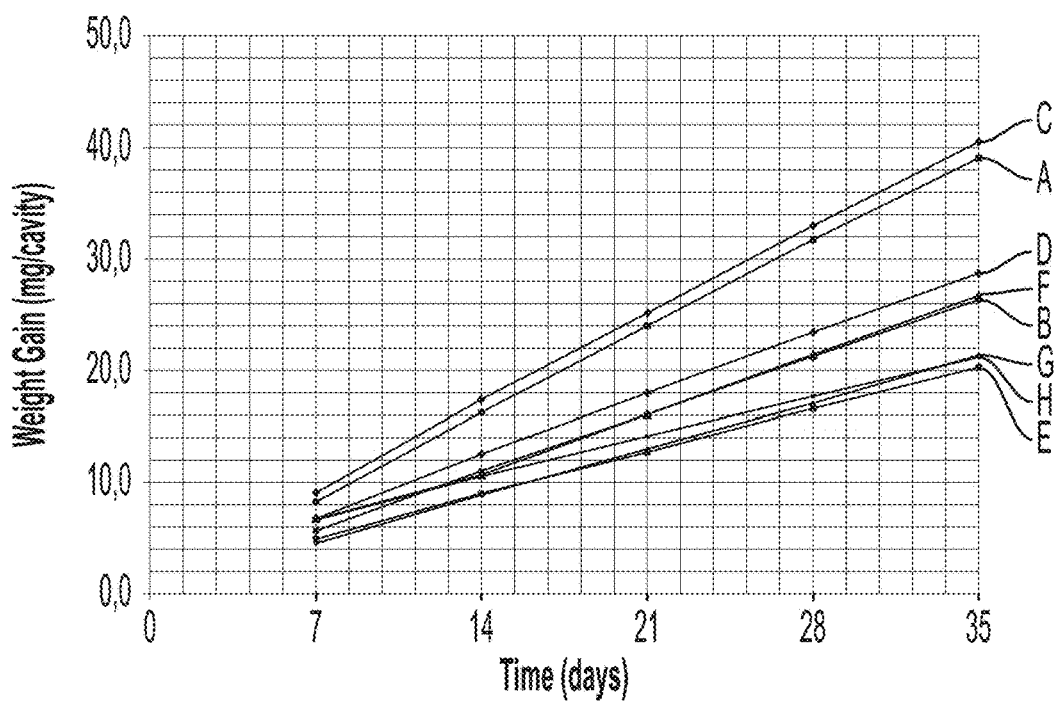

Legend and moisture transmission rate results (grayscale):

| | Blister base | Lidding | SR# | MVTR |
|---|---|---|---|---|
| A | COC P12P WH | BOPP / PP heat seal | 2062 | 1,10 |
| B | COC P12P WH | MET BOPP / PP heat seal | 2057 | 0,74 |
| C | PVC/PVDC 40gsm | Alu push through | - | 1,12 |
| D | PVC/PVDC 60gsm | Alu push through | - | 0,79 |
| E | PVC/PVDC 90gsm | Alu push through | - | 0,56 |
| F | COC P12P WH | SiOx BOPP / PP heat seal | 2059 | 0,76 |
| G | COC P12P WH | SiOx BOPP / PP heat seal | 2060 | 0,60 |
| H | COC P12P WH | BOPET / Alu / PP heat seal | 2017 | 0,52 |

FIG. 11B

RECYCLABLE BLISTER PACKAGE

FIELD OF THE INVENTION

The present invention relates to blister packaging, and in particular to blister packaging that can be recycled in a single plastic waste stream, including both the entire lidding film and base.

BACKGROUND

Blister packages are commonly used to retain ingestible products, such as candy, gum, powders, medicine tablets and the like. This type of packaging is convenient for separately securing individual product portions or doses. Each individual portion may be dispensed from the package while leaving additional portions sealed within the package.

In a traditional blister package, an article (e.g., a medicine tablet) is held in a cavity of a blister base member and a lidding film extends over the open top end of the cavity and is sealed to the base member around the cavity perimeter. There are two ways for releasing the article from the sealed blister package: 1) by pushing on the outer surface of the base cavity, applying enough force (via the enclosed article) to rupture the lidding film, i.e., the article is "pushed through" while rupturing the lidding film; or 2) by "peeling away" the lidding film from the base thereby allowing release of the article from the now open top end of the cavity.

The lidding film of a push-through package is typically made of aluminum (Al) foil, a material that is sufficiently brittle so as to rupture and allow release of the article. This requires a certain amount of force and dexterity to rupture the AL foil film, such that the package can be difficult to open.

Peelable lidding film is also typically made of Al foil, and again requires a certain force and dexterity to grasp one edge of the foil and pull the foil away from the base member. Often the foil is sufficiently difficult to peel that not all of the foil is removed from the base and/or the user becomes frustrated and instead punctures the lidding film to evacuate the article, leaving part or all of the AL foil still attached to the base.

A third type of blister package has a blister base that be easily be broken into two parts (fractured) for evacuating the article from the fractured base.

A typical blister base is made from a thermoformable plastic, while the lidding film is an extruded single layer or multi-layer film that includes a layer of Al foil. As a result of the Al foil and/or different plastic material layers, the blister package cannot be recycled via a single plastic waste stream.

It is also known to provide a puncture resistant lidding film, for example composed of three layers: a bi-axially oriented polyester terephthalate (PET) layer, an Al foil layer, and a heat seal layer. The foil layer provides a barrier function, while the PET layer provides puncture resistance. Again this combination of lidding film and blister base is not suitable for recycling in a single plastic waste stream.

SUMMARY OF INVENTION

It would be desirable to provide a blister package that is recyclable in a single plastic waste stream.

In one embodiment, it would be desirable to provide a puncture resistant lidding film for sealing an article in a cavity of a blister base.

In one embodiment, it would be desirable to provide a blister package with a barrier property, so as to prevent or retard access of one or more outside contaminants or substances that reduce the shelf life of the article from entering the sealed cavity of the blister package.

In accordance with one embodiment of the invention, a blister package is provided that includes a base made from cyclic olefin copolymer (COC) and a lidding film that includes polyolefin layer(s) or a combination of polyolefin and COC layers, that allows both the lidding film and base to be recycled in a single plastic waste stream.

In one embodiment, the lidding film and/or base are further composed of a polyolefin layer, such as polypropylene (PP) or polyethylene (PE) layer, which together with the cyclic olefin copolymer (COC) layer(s) allows both components (base and lidding film) to be recycled in a single plastic waste stream (either a PP or a PE waste stream).

In one embodiment, the adjacent COC layers of the lidding film and blister base structures provide the heat seal function, for bonding the lidding film around the perimeter of the base cavity (holding the product).

In one embodiment, the COC of the blister base is configured to be ruptured by applying a snapping force to rupture the blister base, thereby allowing release of the article via the ruptured base. The resulting components, the lidding film still adhered to the blister base after removal of the article from the ruptured base, can then be recycled in a single waste stream, such as a PP waste stream where the lidding film includes a PP layer, or a PE waste stream where the lidding film includes a PE layer.

In one embodiment, a puncture resistant lidding film is provided which includes a layer of a bi-axially oriented PP (BOPP) or bi-axially oriented PE (BOPE) layer, to provide the puncture resistance. The lidding film is configured to be peeled away from the blister base to enable release of the article from the recess or cavity of the blister base. Again both parts of the blister package can be recycled in a single PP or PE waste stream.

In one embodiment, both the blister base and the lidding film include a polyolefin (PP or PE) surface layer or skin that can be heat sealed (to temporarily attach the lidding film to the base, with the article sealed in a cavity of the base), while allowing the lidding film to be grasped and peeled away from the perimeter of the base so as to allow release of the article from the recess. Again the resulting lidding film and base components can be recycled in a single waste stream, namely a PP or PE waste stream depending on the type of polyolefin (PP or PE) used to form the temporary heat seal, and optionally with the same polyolefin (PP or PE) being used to provide a puncture resistance bi-axially oriented PP or bi-axially oriented PE layer of the lidding film.

In another embodiment, the lidding film includes a metallization layer, or an inorganic barrier layer (such as SiOx or AlOx), to provide a barrier property for protecting the article sealed in the blister cavity from contamination or a reduction of shelf life. The metallization or inorganic barrier layer may provide a water vapor (moisture) barrier property or an oxygen barrier property. The metallization or inorganic barrier layer is so thin (e.g., a few angstroms) so as not to preclude its inclusion in a single plastic waste stream of PP or PE (along with the other COC and PP or PE layers).

In one embodiment, a halogen-free recyclable moisture barrier blister package is provided comprising a lidding film and a base, the base having a plurality of base cavities each configured to hold an individual product portion, the lidding film and base being heat sealed together about a perimeter of each of the plurality of base cavities, and:

the base comprises a thermoformed sheet having one or more layers of cyclic olefin copolymer (COC) alone, or one or more layers of COC in combination with one or more layers of polyolefin;

the lidding film comprises a laminated or extruded sheet having one or more layers of polyolefin, or one or more layers of polyolefin in combination with one or more layers of COC;

the combination of the base and the lidding film is recyclable in a single plastic polyolefin waste stream based on the polyolefin layer(s) of the lidding film and/or the base;

the package has a moisture vapor transmission rate (MVTR) measured via a 5-week weight gain test at 40° C. and 75% relative humidity (RH) as defined in ASTM D7709 of no greater than 2 milligram per cavity per 24 hours for a standard capsule size 0 cavity.

In one embodiment, the blister package has a MVTR of no greater than 1 milligram per cavity per 24 hours.

In one embodiment, both the base and the lidding film include a polyolefin surface layer comprising polypropylene (PP) or polyethylene (PE) that form a releasable heat seal to temporarily attach the lidding film to the base, wherein the lidding film is configured to be grasped and peeled away from the perimeter of each base cavity so as to allow release of the individual product portion from the cavity.

In one embodiment, the thermoformed sheet of the base is produced from a flat sheet having a moisture vapor transmission rate (MVTR) of less than 1 gram per square meter per 24 hours at 38° C. 90% RH.

In one embodiment, the polyolefin is PP or PE, and the lidding film and base are recyclable in a single plastic waste stream, namely a PP or PE plastic waste stream depending on the type of polyolefin (PP or PE).

In one embodiment, the polyolefin consists essentially of polypropylene (PP), which together with the COC is recyclable in a PP plastic waste stream.

In one embodiment, the polyolefin consists essentially of a polyethylene (PE), which together with the COC is recyclable in a PE plastic waste stream.

In one embodiment, the lidding film and base have adjacent COC layers for heat sealing the lidding film around the perimeter of each base cavity.

In one embodiment, the lidding film and base have adjacent polyolefin layers for heat sealing the lidding film around the perimeter of each base cavity.

In one embodiment, the adjacent polyolefin layers are PP.

In one embodiment, the adjacent polyolefin layers are PE.

In one embodiment, the COC layer of each cavity of the blister base is configured to be ruptured by applying a snapping force to rupture the blister base cavity, thereby allowing release of an individual product portion from the ruptured base cavity, wherein the lidding film, still adhered to the blister base after rupture of each base cavity and removal of the product portion from each ruptured base cavity, is recyclable in a single plastic waste stream.

In one embodiment, the lidding film includes a PP layer and the lidding film and base are recyclable in a PP plastic waste stream.

In one embodiment, the lidding film includes a PE layer and the lidding film and base are recyclable in a PE plastic waste stream.

In one embodiment, the lidding film is a puncture resistant lidding film.

In one embodiment, the puncture resistant lidding film includes a puncture resistant layer of bi-axially oriented PP (BOPP) or bi-axially oriented PE (BOPE).

In one embodiment, the lidding film is configured to be peeled away from the blister base to enable release of the individual product portion from each cavity of the blister base.

In one embodiment, the lidding film includes: a peelable PP layer and the lidding film and base are recyclable in a PP plastic waste stream, or a peelable PE layer and the lidding film and base are recyclable in a PE plastic waste stream.

In one embodiment, the lidding film further includes one or more of a metallization, SiOx or AlOx layer configured to provide a barrier property for protecting the individual product portion sealed in each blister cavity from contamination or a reduction of shelf life, wherein the metallization, SiOx or AlOx layer has a thickness of a few angstroms so as not to preclude its inclusion in a single plastic waste stream.

In one embodiment, the metallization, SiOx or AlOx layer is configured to provide a moisture barrier property or an oxygen barrier property.

In one embodiment, the lidding film includes a metallization, SiOx or AlOx layer configured to be recyclable in a single plastic waste stream.

In one embodiment, one or more layers of the lidding film and base are configured to provide a barrier property that prevents or retards access of one or more outside contaminants or substances that reduce the shelf life of the individual product portion from entering each cavity of the blister package.

In one embodiment, the package has a moisture vapor transmission rate (MVTR) measured via a 5-week weight gain test at 40° C. and 75% relative humidity (RH) as defined in ASTM D7709 that is equal to or less than that of a comparative package having a base of PVC and PVDC material at a coating weight of 40 grams per square meter onto a PVC base having a thickness ranging from 150 micrometer to 500 micrometer and an Aluminum foil push-through lidding film.

BRIEF DESCRIPTION OF THE DRAWINGS

For purposes of illustrating the invention, there is shown in the drawings and described various embodiments which are suitable or presently preferred, it being understood that the invention is not limited to the specific arrangements and materials shown, wherein:

FIG. 2 is a 3×2 grid of six alternative structures, arranged in a grid of three columns.

FIGS. 3-5 illustrate various examples of a blister package of a type that may be used in the present invention, wherein FIG. 3 is an exploded perspective view of the constituent parts of a blister package in one embodiment; FIG. 4 is a cross sectional view of one sealed cavity of the blister package assembly of FIG. 3; and FIG. 5 is a schematic view of a blister package assembly process.

FIGS. 8A and 8B illustrate the results of an NIR sorting step for three test packages made from various materials for the lidding film and base, wherein FIG. 8A is a chart listing the test package number and respective materials for the blister base and lidding film of each test package, and FIG. 8B is a chart illustrating the measured Intensity (col. 2), Classification (col. 3) and Valve Control (col. 4) for the respective test package (sample no.) identified in col. 1.

FIGS. 9A-9C list the sorting test results for the samples of FIGS. 8A-8B.

FIGS. 10A-10B show various examples of base and lidding film structures (FIGS. 10A and 10B respectively), including the layer thicknesses and layer materials.

FIG. 11A lists moisture barrier test results for various blister base examples, and FIG. 11B is a graph of weight gain versus time for moisture barrier test results comparing various embodiments of the invention to comparative PVC/PVDC packages.

DETAILED DESCRIPTION

Figure 1:
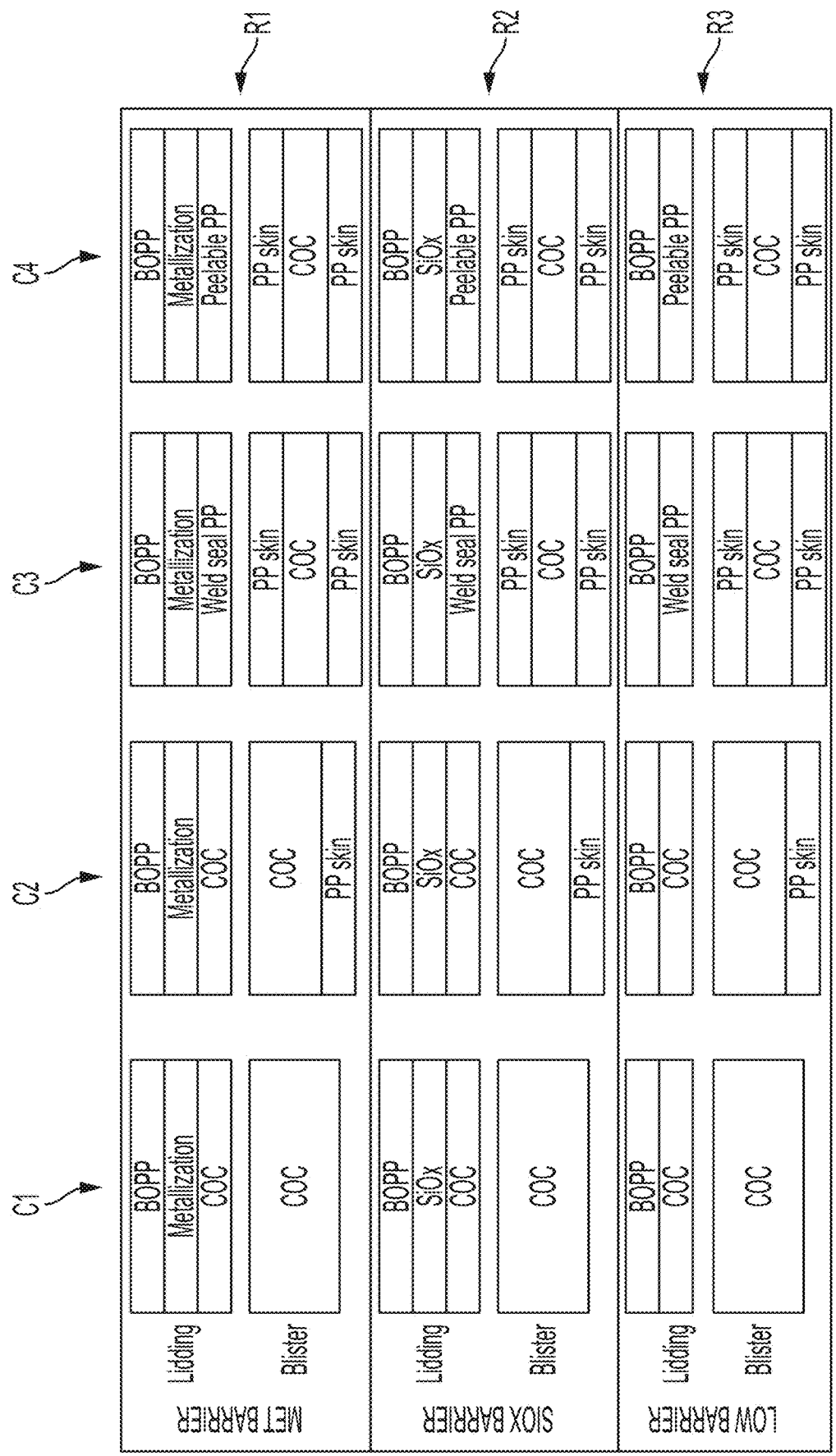
FIGS. 1-2 show twelve alternative layer structures and compositions for both the lidding film and base member in various embodiments of the invention, FIG. 1 being a 4×3 grid of twelve alternative structures, arranged in a grid of four columns.
Figure 2:
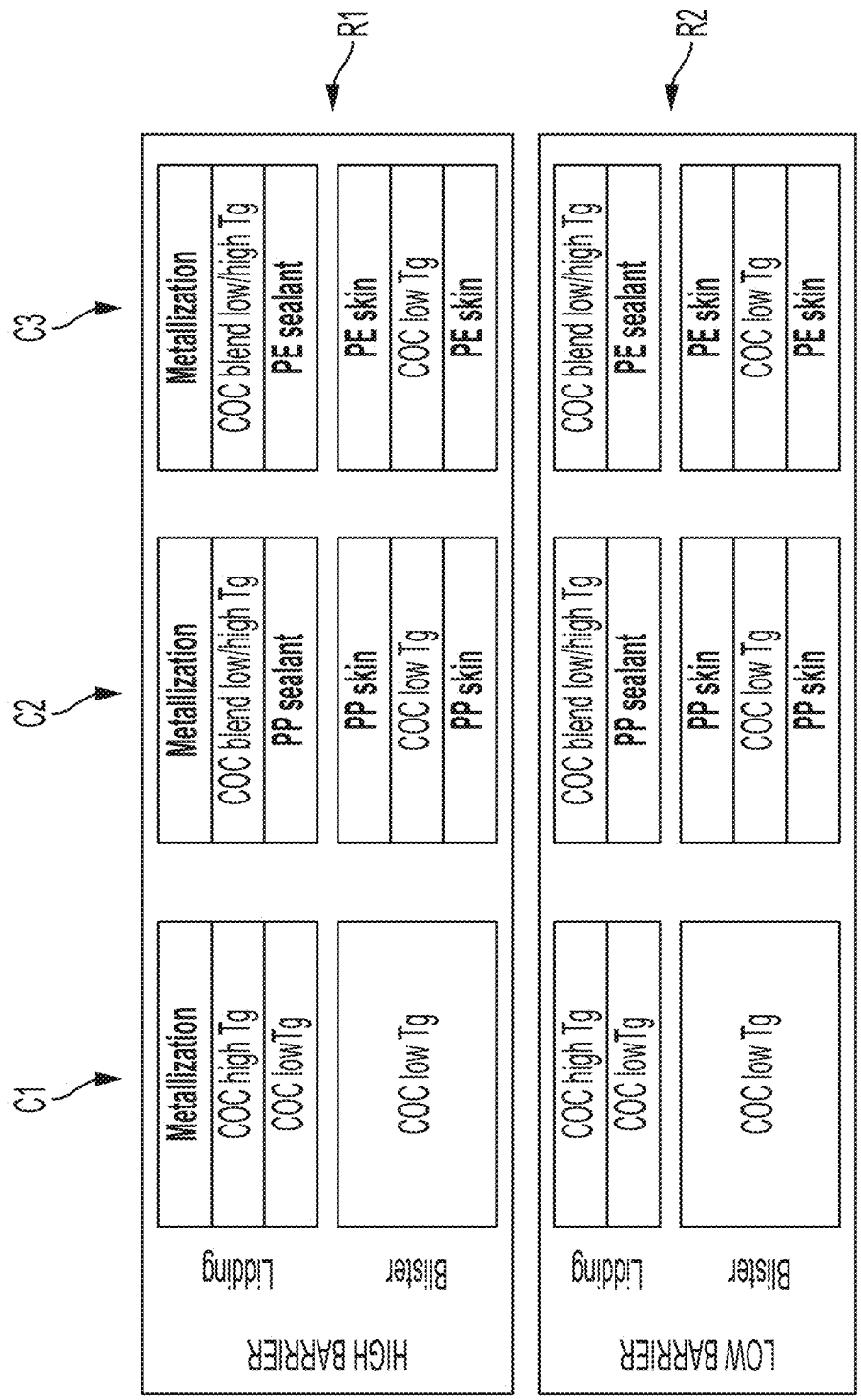

FIGS. 1-2 show twelve alternative layer structures and compositions for both the lidding film and base member in various embodiments of the invention.

FIG. 1 is a 4×3 grid of twelve alternative structures, arranged in a grid of four columns (C1, C2, C3 and C4, from left to right), and three rows (R1, R2 and R3, from top to bottom), wherein:
  a) The first row (R1) of examples each include a metallization barrier layer (as described further below) in the lidding film;
  b) The second row (R2) includes a SiOx barrier layer in the lidding film; and
  c) The third row (R3) are examples without a barrier layer in the lidding film.

All of the alternative lidding film structures of FIG. 1 include a puncture resistant BOPP (or alternatively BOPE) layer, such that these examples rely on rupture of the base or a peelable lidding film in order to remove the product. The examples in the first three columns (C1, C2 and C3) are structures in which the lidding film and blister base are permanently attached and the user breaks the blister base to release the article (see for example FIG. 6). The fourth column (C4) of FIG. 1 are examples where the user peels the lidding film off of the blister base to release the article from the cavity. In the examples of FIG. 1, the layers designated polypropylene (PP) or BOPP can alternatively be polyethylene (PE) or BOPE, in which case the lidding film and base will be recyclable in a PE plastic waste stream (as opposed to a PP plastic waste stream).

FIG. 2 is a 3×2 grid of six alternative structures, arranged in a grid of three columns (C1, C2 and C3, from left to right), and two rows (R1 and R2, from top to bottom), wherein:
  a) The first row (R1) of examples each include a metallization barrier layer in the lidding film; as an alternative to the metallization layer, an inorganic barrier layer (such as SiOx or AlOx) may be included in each example;
  b) The second row (R2) are examples without a barrier layer in the lidding film.

Also in FIG. 2, the alternative examples in all three columns (C1, C2 and C3) are structures in which the lidding film and blister base are permanently attached and the user ruptures the lidding film to release the article.

In the examples above, the COC high Tg (high glass transition temperature) layer provides a high level of brittleness (easy to rupture) to enable push-through performance. The COC low Tg layer provides low brittleness (compared to the high Tg COC) to ensure toughness (puncture resistance). A COC blend of high/low Tg can be adjusted to provide a desired balance of ease of rupture (brittleness) of the lidding film during evacuation of the tablet, while remaining intact (puncture resistance) under tension during manufacture (e.g., during extrusion of the lidding film, slitting the extruded roll of lidding film for individual packages, and sealing of the lidding film to the blister base).

Suitable cyclic olefin copolymers COC include Topas COC 8007, Topas COC 6013, Topas COC 6015, Topas COC 7010, Zeonor 1020R, Zeonor 1060R Zeonor 1420R and Zeonex 690R. Topas COC resins are available from Polyplastics Co. Ltd, Tokyo, Japan. Zeonor and Zeonex resins and films are available from Zeon Europe GmbH, Dusseldorf, Germany. COC resins are clear/transparent and provide a water vapor barrier. They have high heat moldability and can be used to form both the thermoformed base, and an extruded lidding film.

Suitable thicknesses of the blister base are in a range of 200 microns to 500 microns. Suitable thicknesses of the COC layer in the base are in a range of 50 microns to 450 microns. Suitable thicknesses for the lidding film are in a range of 20 microns to 150 microns. Suitable thicknesses for the COC layer in the lidding film are in a range of 20 microns to 150 microns.

An acceptable level of force (push-through force) to rupture the lidding film is in a range of 10 to 20 Newtons.

The metallization layer refers to a thin (angstroms thick) metal coating applied to a plastic carrier film. The resulting metallized film, also known as metal-transfer or transferred-metal film, provides reduced permeation (barrier properties that extend the shelf life of the enclosed product) and a glassy, metallic sheen at a reduced weight and cost. They negate two main problems with metal foil, such as AL foil, namely Al foil is relatively easy to puncture (during transport and handling) and Al foil exhibits dead-fold, wherein once folded, the fold becomes a permanent crease or blemish that most customers find unattractive in packaging. The metallization layer can also be aluminum, but the thickness of the metallization layer is only a few angstroms. Alternatively, an inorganic barrier layer (such as SiOx or AlOx) can be included. The carrier film can be bi-axially-oriented polypropylene (BOPP) or bi-axially-oriented polyethylene (BOPE), or COC. Metalized films cannot be thermoformed, as they will not soften under heat. They can be used in the lidding film and due to the very low thickness of the metallization layer, will not impact the recycling stream of the carrier film material.

In the examples, weld seal means the adhesion between the lidding film and base after sealing is so high that the two elements become inseparable—one or both will fail structurally (e.g., rupture of the lidding film) before the two elements can be separated. The required process parameters (heat, pressure, time) to achieve such condition will vary based on the type of materials, thickness, etc. Likewise the force required to cause rupture of the lidding film will depend on the type of material, thickness, etc.

In the examples, a peelable seal means that the adhesion between the lidding and base is lower than the force required for structural failure of the lidding film. An acceptable peelable force typically falls below 5 N/15 mm (force in Newtons (N), displacement in millimeters (mm)).

Figure 3:
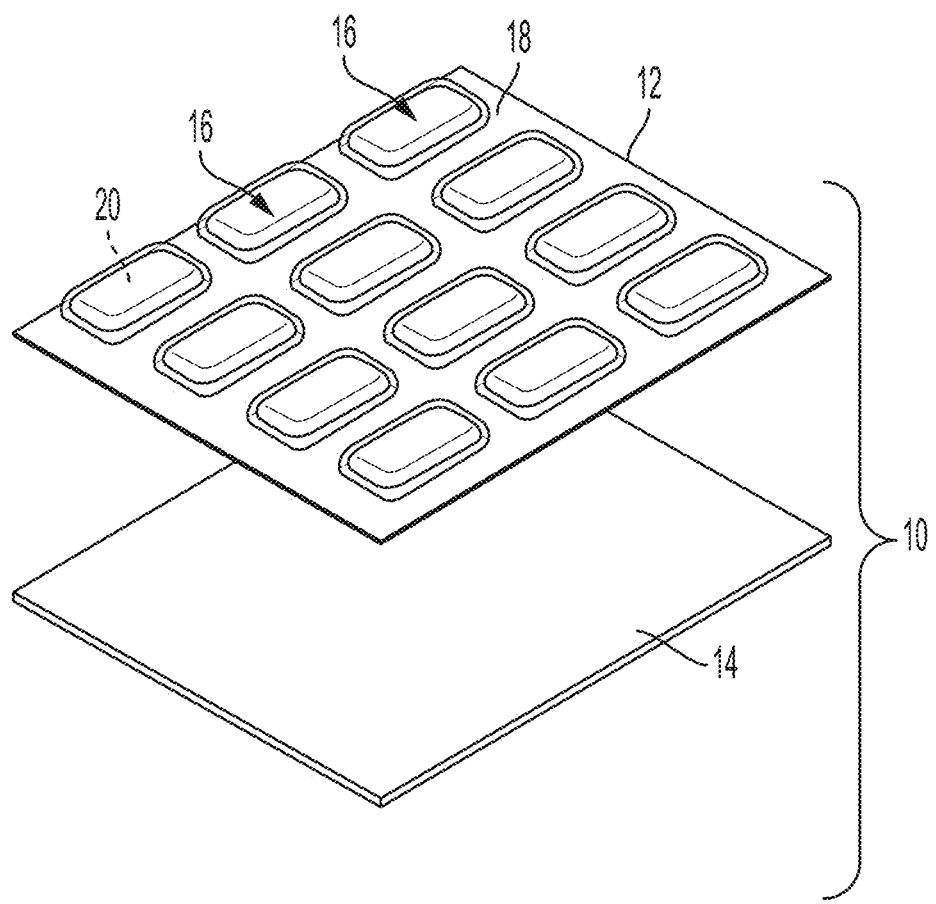
Figure 4:
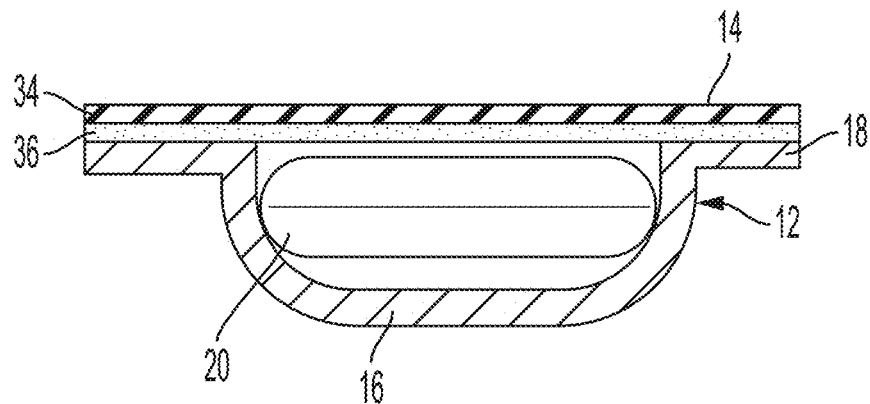
Figure 5:
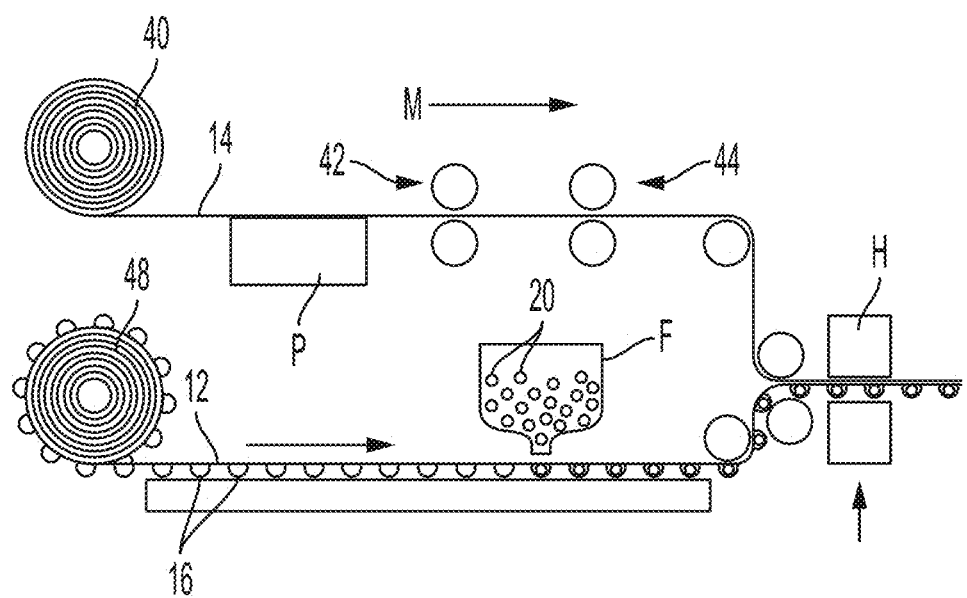

FIGS. 3-5 illustrate an example of a blister package of a type that may be used in the present invention, it being understood that the invention is not limited to this specific structural design or implementation. FIG. 3 is an exploded perspective view of the constituent parts of a blister package in one embodiment. FIG. 4 is a cross sectional view of one sealed cavity of the blister package assembly of FIG. 3. FIG. 5 is a schematic view of a blister package assembly process.

Referring to FIG. 3, a blister package is generally referred to by the numeral 10. The constituent parts of the blister package 10 are a thermoformed base member 12, and a lidding film 14 formed by extrusion (or similar process). The base 12 includes a plurality of recessed cavities 16 typically arranged in an aligned pattern or array, with each cavity 16 separated by a planer sealing flange 18. Each cavity 16 retains an article or product 20. The blister package may be formed with any number of cavities, including a single cavity, and each cavity may retain an individual article as the product, such as the tablet illustrated, multiple products or a quantity of loose product, such as a powder or granular material. A series of separation lines (not shown) may be provided within the sealing flange, between adjacent receptacle cavities, or multiple cavities, so as to permit separation of a portion of the base from the remainder, as desired.

The lidding film 14 is shown in FIG. 3 as separated from the base 12 for illustration purposes. The lidding film 14 is joined to the base 12 in FIG. 4. As shown, the lidding film 14 is joined to the sealing flange 18 (an area around the perimeter of the cavity 16) such that each individual cavity 16 is covered and closed. Optionally a score pattern (not shown) may be formed within the lidding film 14 to assist in push-through rupture of the film, but is not required. In FIG. 4, the rupture force is represented by the arrow 24, with the resulting tear/rupture in the lidding film 14 above the cavity 16 releasing a previously sealed product.

As shown in FIG. 4, the relatively outer part 34 of the lidding film 14 is the structural portion of the layer and is formed of a polymer material. The second or inner part 36 of the lidding film 14 as shown forms the sealing layer for attachment of the lidding film to the sealing flange area 18 of the base. The inner part 36 of the lidding film may be a separate polymer layer and may be formed as part of a laminate structure, with the inner part being compatible with the material of the sealing flange. A heat seal coating may be applied on the inner surface of the laminate. As a further alternative, the lidding film 14 may be secured to the flange 18 by a patterned adhesive or similar attachment mechanism. A print layer (not shown) may be provided within the structure and other layers may be included or added. It is preferred that the lidding film not include a paper or metal foil layer.

In FIG. 5 there is schematically shown a forming and assembly process for the blister package 10. The material used to form the lidding film 14 is shown in web form and is provided in a roll 40. As shown, the web is wound off of a roll 40 and is fed into a printing station P. The web may be printed on either or both surfaces. The web is moved by rollers 42/44 to be joined with the sealing flange of the base substrate. The base substrate 12 is shown as being provided in rolled from 48. The cavities 16 may be formed as part of the process or prior to the formation of the roll 48. The cavities 16 in the base substrate 12 are filled with product 20 at a filling station F and the open end of each cavity is brought into alignment with the lidding film web 14 at the heating station H (or similar station for securing the lidding film to the base substrate. The lidding film web 14 is sealed to the sealing flange (18) to close each cavity 16 (and seal the product 20 therein). The combined web and substrate is cut and separated as desired to define a package having the desired number and pattern of product cavities.

The schematic of FIG. 5 is provided to show the steps of one embodiment of an assembly process for a finished package. These steps may be performed together or as part of separated operations. For example, the web material forming the lidding film 14 may be printed, coated and die cut as part of one operation or separate processing operations. The printed, coated and cut web, which is stored in a roll, may be slit to form narrow rolls, having a width comparable to one package. The slit rolls may then be separately sealed to the base substrate, with the individual packages cut from the elongated combination. Other operations may be performed within this general process outline.

Figure 6:
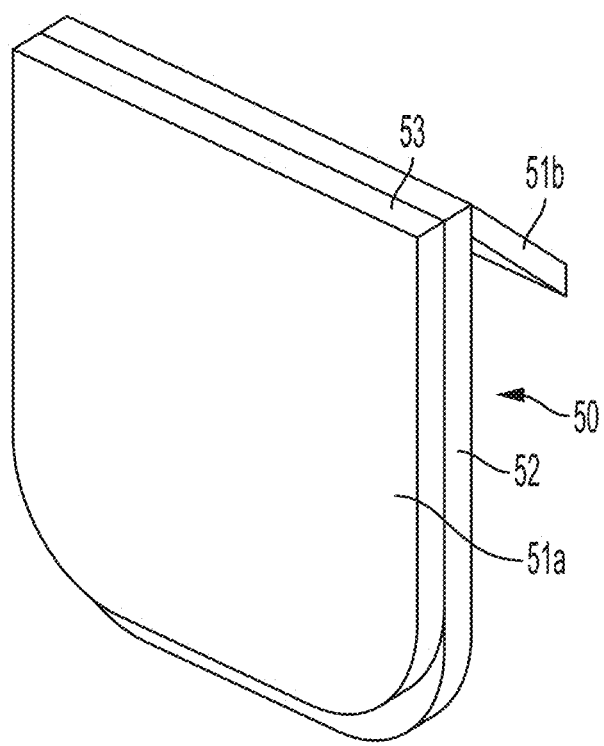
FIG. 6 shows one example of a blister package with a fracturable base member.

FIG. 6 shows one example of a blister package with a fracturable base member. The package 50 includes a lidding film 52 attached to the rear surface of a thermoformed base substrate 51, shown here with a single cavity, and following fracture of the base member at fracture line 51 the base forms two base portions 51a and 51b with the product being released at the opening formed at the fracture line 53.

These and other embodiments of the invention may be made in accordance with the foregoing disclosure.

Recycling Process

Figure 7:
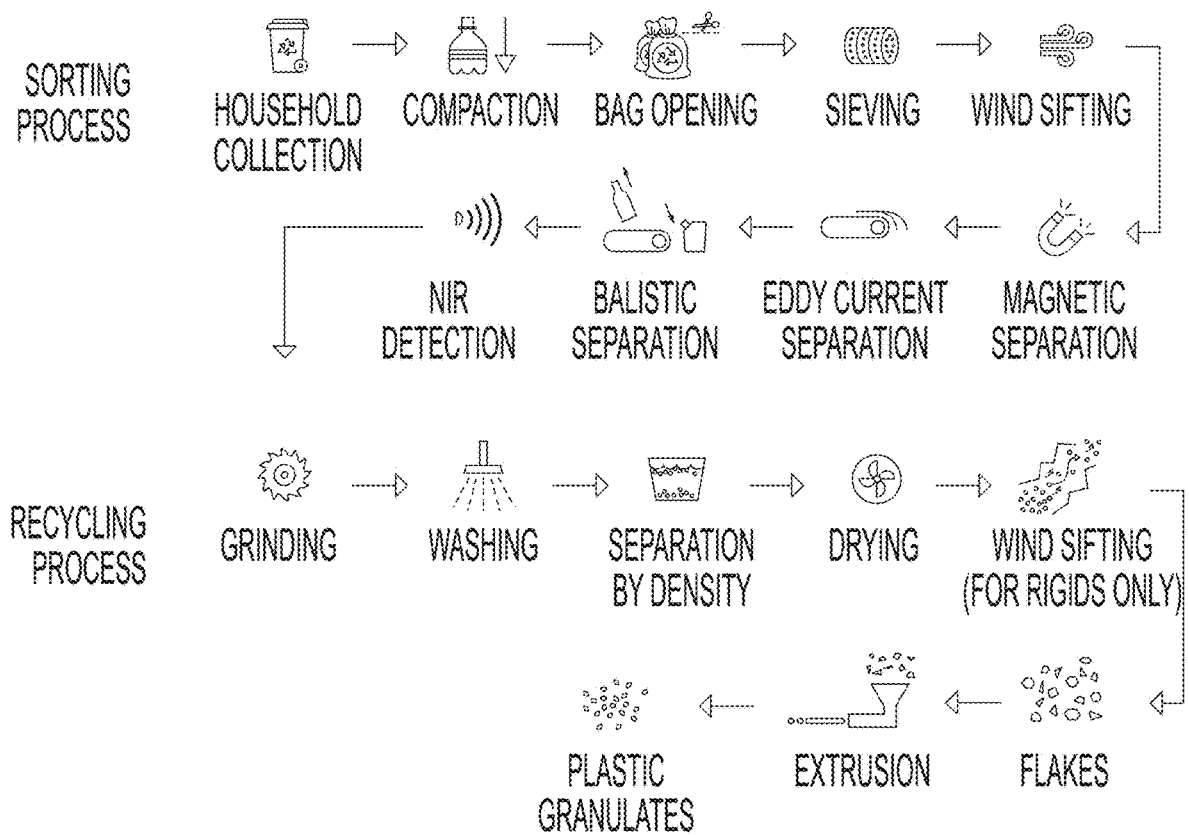
FIG. 7 is a schematic illustration of the steps of a typical recycling process.

A typical recycling process, as illustrated in FIG. 7 (source: Recyclass), consists of multiple steps. In order to demonstrate that a package is considered technically recyclable, laboratories simulate these steps to determine whether a package will be able to be recycled.

An important step in the recycling process is Near Infrared (NIR) detection. In this process step, an infrared sensor determines which polymers a package is constituted of, such as PE, PP, PET, etc. In case multiple polymers are detected, a package will not be selected for recycling. In case only one polymer is detected, the package will be sorted in its respective polymer group and further recycled into PCR (post-consumer, recycled) resin pellets.

The present invention relates to a blister package made of a blister base and a lidding film composed of polymers that are detected as one polymer and can be recycled into one polymer recycling stream.

As an example, three sample blister packages made from the blister base and lidding materials listed in FIG. 8A (and further described below under the section "Test Structures") were subjected to an NIR sorting test at an external laboratory (Cyclos-HTP GmbH). The results are shown in columns 2-4 of FIG. 8B, for each of the Sample Package Nos. listed in column 1. The Intensity (col. 2) indicates how well the package was detected based on visual characteristics. The Classification (col. 3) indicates which polymer type was detected by the NIR system; while shown in FIG. 8B in gray scale, the results would be color images that may be visually sorted for example into the following recycling categories or polymer groups: PCT bottle, PE 2D (polyethylene two dimensional), EPS, PUR, Elastomers, PET-lister, PS, PA, POM/PMMA/PLA, EVOH29, PP 3D (polypropylene three dimensional), paper/cardboard, PA6, PVC, EVOH44, PP 2D polypropylene two dimensional), liquid packaging board, PA6-66, wood, ABS, PE 3D, PBT, PC, textiles, unknown. The Valve Control (col. 3) shows into which polymer group the package was sorted based on the Classification results. In each of cols. 2-4 of the table (FIG. 8B), the left-hand side picture shows the detection from the blister base side, whereas the right-hand side picture shows the detection from the lidding film side.

Per the results shown in FIGS. 9A and 9B, the three package sample numbers 1, 2 and 3 were completely identified as polypropylene PP from both sides (front and back, of sample). Based on this clear identifiability and reliable sorting using NIR separators, the three samples were designated an unrestricted sortability as "PP" (FIG. 9C).

Test Structures

Three reference blister base structures were produced for testing as illustrated in FIG. 10A, having the reference base identifiers listed in column 1, and the designated serial layer structures, layer thicknesses, and layer materials listed in columns 2-4.

The PP resins used were commercially available homopolymer or copolymer PP resins. The COC resin used was a COC resin such as Topas 8007 F04.

As described in FIG. 10B, various peelable and weld seal lidding structures were produced (identified by reference # in the first column, and having the designated serial layer structures, layer thicknesses, and representative layer materials listed in columns 2-4).

The PP heat seal film for weld seals were RP423BX (white or clear) from Copol International. The PP heat seal film for peelable seals were CP423BXP (white or clear) from Copol International. The SiOx BOPP film was GL-LP-G from Toppan or Ceramis CPP009 from Amcor. The MET (metallized) BOPP film was Torayfan M10 from Toray Plastics America. The BOPP film was Propafilm TE49 from Innovia. The COC film was produced internally from Topas COC 8007 F04 resin. All structures were adhesive laminated.

In various embodiments, the following push-through lidding structures, single layer or multilayer structures, may be composed of one or more of the following materials:
- Blends of high and low Tg COC grades (such as Topas 8007, 5013, 6013, 6015, . . . )
- Blends of COC and LDPE
- Blends of COC and ethylene copolymers
- Blends of COC and PP
- Blends of COC and propylene copolymers
- SiOx BOPP
- MET BOPP The BOPP layers exhibit high tensile strength and are unsuitable (without further modification) for push-through lidding. Techniques such as scoring (partial perforation) can be applied to make BOPP layers suitable for push-through lidding. Such a technique is described in U.S. Pat. No. 11,014,729 by Tekni-Plex.

Evaluation of Barrier Properties

Blister packages are designed to protect the contents (e.g., oral-administered solid drug capsules or tablets) from moisture in order to maintain their efficacy. Such drugs exhibit different levels of sensitivity, therefore blister packages are made from different materials with increasing moisture barrier properties. Transparent thermoformable blister packages can be divided into three groups based on moisture barrier properties, low barrier, high barrier, and ultra-high barrier, as illustrated in FIG. 11A.

As suitable or representative materials there are included for example: PVC film such as Flexapharm NS products from Tekni-Plex Gallazzi. PET film such as Tekniflex PX products from Tekni-Plex. PVC/PVDC (traditional barrier) and PVC/PVDC (ultra-high barrier) such as Flexapharm C, HC and SBC products from Tekni-Plex Gallazzi. PVC/PCTFE film such as Tekniflex VA products from Tekni-Plex. PP-COC-PP, PP-COC-EVOH-PP and COC films such as Tekniflex COC and Tekniflex ECO from Tekni-Plex.

In the low barrier category, the majority of blister packages are made from PVC blister base with Al foil push-through lidding. The lidding is permanently attached to the blister base and therefore makes the blister package not suitable for recycling. In this category, blister packages can be made from PET blister base combined with a scored PET lidding, in order to form a fully recyclable PET blister package. Such examples are described for instance in U.S. Pat. No. 11,014,729 by Tekni-Plex.

In the high barrier category, the majority of blister packages are made from PVC/PVDC blister base with Al foil push-through lidding. The lidding is permanently attached to the blister base and therefore makes the blister package not suitable for recycling. In this category, the current invention is proposed: PP-COC-PP, PP-COC-EVOH-PP or COC films as the blister base, combined with high barrier lidding structures.

Moisture barrier properties on blister packages are typically measured via weight gain studies, such as ASTM D7709. Blisters are filled with desiccants and stored at 40° C. 75% relative humidity (RH) for 5 weeks. Each week, the weight gain of the blisters is measured. The increase in weight represents the moisture uptake by the desiccants through the blister materials. The slope of the linear regression lines represent the moisture vapor transmission rate (MVTR) for the blister package. This method was used to evaluate the present invention.

FIG. 11B is a graph (in grayscale, with designated identifiers A-H for each sample package and comparative package as designated in the legend), of the results from the ASTM D7709 test procedure described in the preceding paragraph.

One can conclude that the blister packages made from structures related to the present invention show a moisture vapor transmission rate that falls within the range of blister packages made from traditional PVC/PVDC 40 to 90 gsm base films and Al foil push-through lidding film.

The invention claimed is:

1. A halogen-free recyclable moisture barrier blister package comprising a lidding film and a base, the base having a plurality of base cavities each configured to hold an individual product portion, the lidding film and base being heat sealed together about a perimeter of each of the plurality of base cavities, and:
   the base comprises a thermoformed sheet having one or more layers of cyclic olefin copolymer (COC) in combination with one or more layers of polyolefin;
   the lidding film comprises a laminated or extruded sheet having one or more layers of polyolefin, or one or more layers of polyolefin in combination with one or more layers of COC;
   wherein the lidding film and base have adjacent polyolefin layers heat sealing the lidding film around the perimeter of each base cavity;
   the combination of the base and the lidding film is recyclable in a single plastic polyolefin waste stream based on the polyolefin layer(s) of the lidding film and/or the base;
   the package has a moisture vapor transmission rate (MVTR) measured via a 5-week weight gain test at 40° C. and 75% relative humidity (RH) as defined in ASTM D7709 of no greater than 2 milligram per cavity per 24 hours for a standard capsule size 0 cavity;
   wherein the polyolefin is polypropylene (PP) or polyethylene (PE), and the lidding film and base are recyclable in a single plastic waste stream, namely a PP or PE plastic waste stream depending on the type of polyolefin (PP or PE).

2. The blister package of claim 1, wherein the package has a MVTR of no greater than 1 milligram per cavity per 24 hours.

3. The blister package of claim 1, wherein both the base and the lidding film include a polyolefin surface layer comprising polypropylene (PP) or polyethylene (PE) that form a releasable heat seal to temporarily attach the lidding film to the base, with an individual product portion sealed in each cavity of the base, wherein the lidding film is configured to be grasped and peeled away from the perimeter of each base cavity so as to allow release of the individual product portion from the cavity.

4. The blister package of claim 1, wherein the thermoformed sheet of the base is produced from a flat sheet having a moisture vapor transmission rate (MVTR) of less than 1 gram per square meter per 24 hours at 38° C. 90% RH.

5. The blister package of claim 1, wherein the polyolefin consists essentially of polypropylene (PP), which together with the COC is recyclable in a PP plastic waste stream.

6. The blister package of claim 1, wherein the polyolefin consists essentially of a polyethylene (PE), which together with the COC is recyclable in a PE plastic waste stream.

7. The blister package of claim 1, wherein the adjacent polyolefin layers are PP.

8. The blister package of claim 1, wherein the adjacent polyolefin layers are PE.

9. The blister package of claim 1, wherein the COC layer of each cavity of the blister base is configured to be ruptured by applying a snapping force to rupture the blister base cavity, thereby allowing release of an individual product portion from the ruptured base cavity, wherein the lidding film, still adhered to the blister base after rupture of each base cavity and removal of the product portion from each ruptured base cavity, is recyclable in a single plastic waste stream.

10. The blister package of claim 1, wherein the lidding film includes a PP layer and the lidding film and base are recyclable in a PP plastic waste stream.

11. The blister package of claim 1, wherein the lidding film includes a PE layer and the lidding film and base are recyclable in a PE plastic waste stream.

12. The blister package of claim 1, wherein the lidding film is a puncture resistant lidding film.

13. The blister package of claim 12, wherein the puncture resistant lidding film includes a puncture resistant layer of bi-axially oriented PP (BOPP) or bi-axially oriented PE (BOPE).

14. The blister package of claim 12, wherein the lidding film is configured to be peeled away from the blister base to enable release of the individual product portion from each cavity of the blister base.

15. The blister package of claim 1, wherein the lidding film further includes one or more of a metallization, SiOx or AlOx layer configured to provide a barrier property for protecting the individual product portion sealed in each blister cavity from contamination or a reduction of shelf life, wherein the metallization, SiOx or AlOx layer has a thickness of a few angstroms so as not to preclude its inclusion in a single plastic waste stream.

16. The blister package of claim 15, wherein the metallization, SiOx or AlOx layer is configured to provide a moisture barrier property or an oxygen barrier property.

17. The blister package of claim 1, wherein the lidding film includes a metallization, SiOx or AlOx layer has a thickness of a few angstroms so as to be recyclable in a single plastic waste stream.

18. The blister package of claim 1, wherein one or more layers of the lidding film and base are a barrier layer to provide a barrier property that prevents or retards access of one or more outside contaminants or substances that reduce the shelf life of the individual product portion from entering each cavity of the blister package.

19. The blister package of claim 1, wherein the package has a moisture vapor transmission rate (MVTR) measured via a 5-week weight gain test at 40° C. and 75% relative humidity (RH) as defined in ASTM D7709 that is equal to or less than that of a comparative package having a base of PVC and PVDC material at a coating weight of 40 grams per square meter onto a PVC base having a thickness ranging from 150 micrometer to 500 micrometer and an Aluminum foil push-through lidding film.

* * * * *